United States Patent [19]

Balaban et al.

[11] Patent Number: 4,517,586
[45] Date of Patent: May 14, 1985

[54] DIGITAL TELEVISION RECEIVER WITH ANALOG-TO-DIGITAL CONVERTER HAVING TIME MULTIPLEXED GAIN

[75] Inventors: Alvin R. Balaban, Lebanon; Steven A. Steckler, Clark, both of N.J.

[73] Assignee: RCA Corporation, Princeton, N.J.

[21] Appl. No.: 443,929

[22] Filed: Nov. 23, 1982

[51] Int. Cl.³ .............................................. H04N 9/32
[52] U.S. Cl. ...................................................... 358/13
[58] Field of Search ............................. 358/13, 17, 19

[56] References Cited

U.S. PATENT DOCUMENTS

| | | | |
|---|---|---|---|
| 2,669,608 | 2/1954 | Goodall | 170/43.5 |
| 3,027,079 | 3/1962 | Fletcher et al. | 235/154 |
| 3,699,325 | 10/1972 | Montgomery, Jr. et al. | 235/154 |
| 3,806,864 | 4/1974 | Broding et al. | 340/15.5 TS |
| 3,930,256 | 12/1975 | Amemiya | 340/347 R |
| 3,947,806 | 3/1976 | Corkhill et al. | 340/15.5 GC |
| 3,981,006 | 9/1976 | Takayama et al. | 340/347 AD |
| 4,122,478 | 10/1978 | Gallo et al. | 358/13 |
| 4,183,016 | 1/1980 | Sawagata | 340/347 AD |
| 4,191,995 | 3/1980 | Farrow | 364/113 |
| 4,251,802 | 2/1981 | Horna | 340/347 AD |
| 4,291,332 | 9/1981 | Kato et al. | 358/19 |
| 4,333,075 | 6/1982 | Whiteside | 340/347 AD |
| 4,352,123 | 9/1982 | Flamm | 358/23 |
| 4,393,372 | 7/1983 | Hoehn | 340/347 AD |

FOREIGN PATENT DOCUMENTS 1239585 7/1971 United Kingdom .
2042294A 9/1980 United Kingdom .

OTHER PUBLICATIONS

H. E. Ennes, *Television Broadcasting—Tape Recording Systems*, Howard W. Sams & Co., 1979, pp. 161-181, 186-193, 243-253, 275-283, 295-304.
ITT Semiconductor, *VLSI Digital TV System DIGIT 2000*, Aug. 1982.
ITT Semiconductor, Confidential Document: *Development Sample Data, MAA 2100 Video Codec Unit (VCU)*, Aug. 1982, pp. 3-1 to 3-3, 3-10.

*Primary Examiner*—Richard Murray
*Attorney, Agent, or Firm*—E. M. Whitacre; P. J. Rasmussen; C. A. Berard, Jr.

[57] ABSTRACT

A digital television receiver includes an analog-to-digital converter having a controllable scaling factor and offset. To improve resolution of the digital samples, the scaling factor is increased and the offset is changed when the synchronizing and color reference burst portions of the composite video signal are being converted. In addition, the scaling can be greatly increased at selected times so that the phase of the color reference burst can be more accurately determined.

18 Claims, 5 Drawing Figures

DIGITAL TELEVISION RECEIVER WITH ANALOG-TO-DIGITAL CONVERTER HAVING TIME MULTIPLEXED GAIN

The present invention relates generally to digital television receivers and, in particular, to analog-to-digital converting arrangements exhibiting scaling and offset which are varied in a predetermined fashion.

In a digital television (TV) receiver, analog video signals, for example, composite video baseband signals, are converted into digital samples by an analog-to-digital converter (ADC). Eight-bit (256 levels) digital samples have been considered adequate to represent the entire range of analog video signal values with satisfactory resolution in such TV receivers.

As in a conventional analog TV receiver, different portions of the digital samples can be employed in the operation of the TV receiver to affect different functions. For example, the digital samples representing synchronizing pulses can be used to control the timing of the deflection circuitry and as a source of gain control information, and the digital samples representing certain phase points of the color subcarrier burst signal can be used as reference signals for the color demodulation and processing apparatus in the receiver. Luminance and chrominance information are supplied by yet another portion of the digital video signals.

In the NTSC TV system used in the United States, the composite video signals can be described in IRE units in which blanking level is at zero IRE units, white level is at 100 IRE units and the horizontal synchronizing pulse "tip" is at −40 IRE units, i.e. a total range of 140 IRE units. When the color subcarrier at maximum modulation level is added, the total range could be 173 IRE units, although normally 160 IRE units corresponds to 100% modulation of the RF carrier. Since the horizontal synchronizing pulse amplitude is about 40 IRE units, only about 40/160 or 25% of the total range is utilized for the synchronization signal. Thus, the resolution is relatively low and the signal-to-noise ratio is relatively high because the full eight bit resolution of the ADC is not available for the synchronization signal. Similarly, the color reference burst signal is nominally 40 IRE units peak-to-peak so that reduced resolution will affect the automatic chroma control system.

Therefore, it is desirable to have a digital TV system in which the available range of digital values is more fully utilized for all portions of the video signal. To that end, the present invention comprises a converting device for converting analog video signals having sequential portions to corresponding digital samples wherein the correspondence between the analog video signals and the digital samples is controllable. A gain controlling device responds to signals indicating the occurrences of the sequential portions for controlling the converting device to obtain different correspondences for each sequential portion.

In the figures, broad arrows represent a plurality of signal paths such as for a plural-bit digital word or a plurality of signals, whereas a single line arrow represents a single signal path such as for an analog signal or a single digital bit. As used herein, "scaling" refers to the correspondence between a given range of input values and a given range of output values, and "offset" refers to the correspondence between a particular input value and a particular output value. Scaling is analagous to gain.

Figure 1:
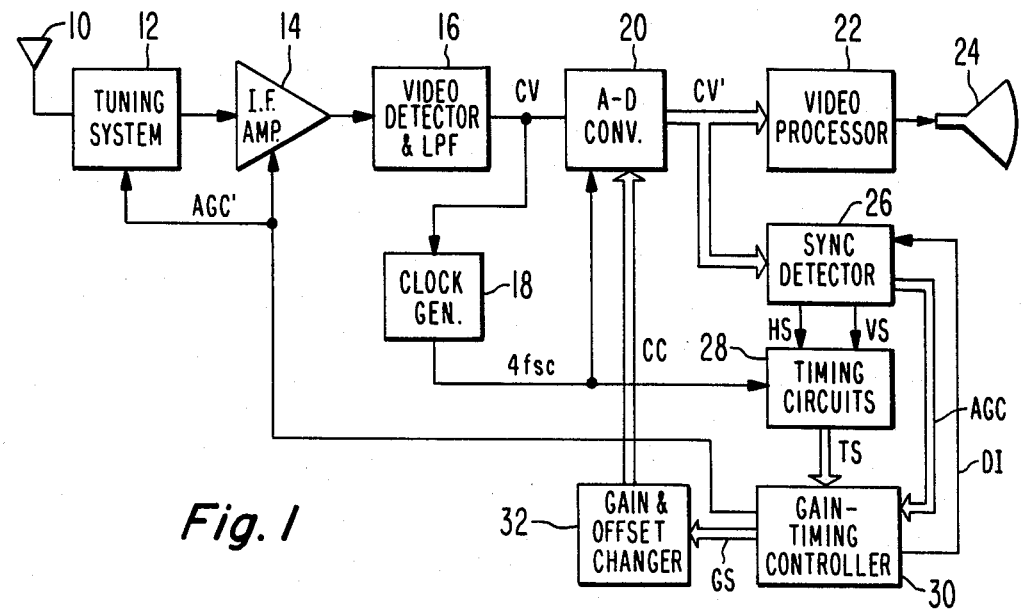
FIG. 1 is a schematic diagram, in block diagram form, of an embodiment including the present invention.

In the digital TV receiver of FIG. 1, tuning system 12 receives radio frequency (RF) TV signals from antenna 10 and converts the RF signals to intermediate frequency (IF) signals. IF signals processed and band-pass filtered by IF amplifier 14 are then detected by video detector and low pass filter 16 which produces a composite video signal CV in conventional fashion.

Figure 2:
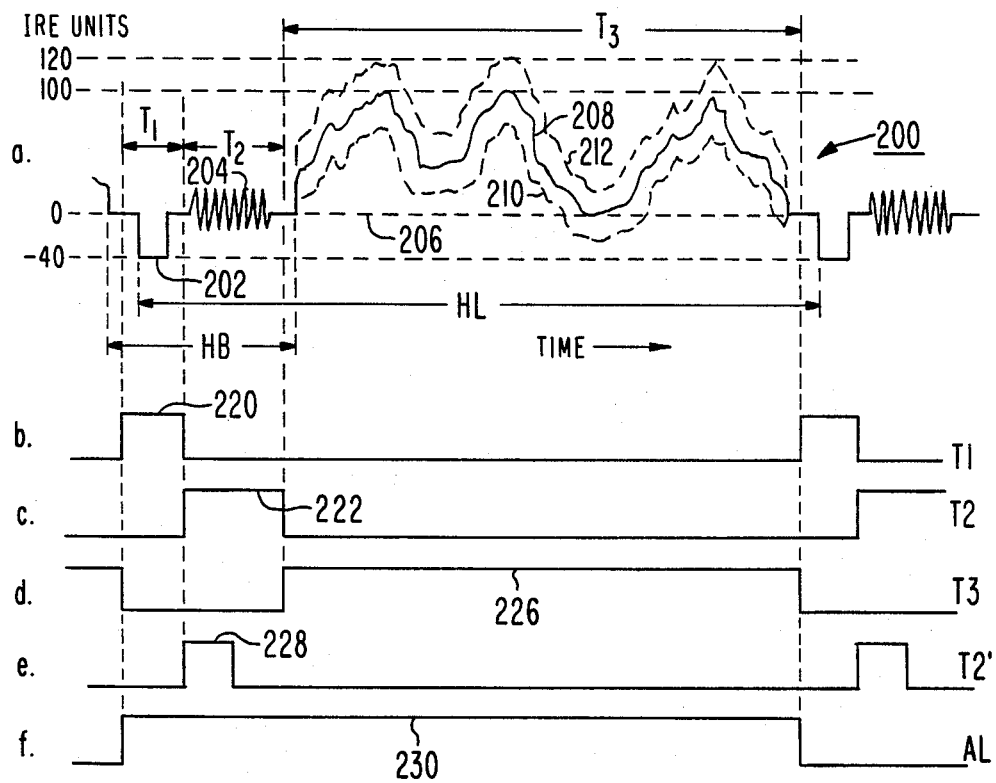
FIG. 2 is a diagram showing signal waveforms useful in understanding the operation of the present invention.

The composite video signal CV includes, for example, in the NTSC system employed in the United States, a series of scanning line signals including sequential portions for providing synchronization, color referencing and picture information. FIG. 2a shows composite video signal CV waveform 200 extending in time slightly more than the time of one horizontal scan line HL. The amplitude of waveform 200 is depicted in IRE units and has a blanking (baseline) level of 0 IRE units. Horizontal blanking interval portion HB of waveform 200 includes a horizontal synchronizing pulse 202 having a nominal amplitude of −40 IRE units and a chroma reference burst signal portion 204 which includes at least eight cycles of a 3.58 MHz color subcarrier signal having a zero-to-peak amplitude of 20 IRE units, both of which are superimposed upon the blanking level 206 at zero IRE units. The amplitude of picture information portion 208 ranges between the blanking level (0 IRE units) and the white level (100 IRE units) plus the amplitiude deviations 210, 212 corresponding to color information modulating the color subcarrier signal. The peak amplitude is 120 IRE units. Thus, it is evident that the synchronizing pulse 202 and the color reference burst signal 204 use substantially less than the full range of 160 IRE units. Additionally, vertical synchronizing signals are received on horizontal lines 1–9 comprising the beginning of the vertical blanking interval of each TV field.

The composite video signals CV are converted into digital video samples CV' by analog-to-digital converter (ADC) 20 which samples at a rate established by the clocking signal $4f_{sc}$. Clock generator 18 includes a PLL which generates the $4f_{sc}$ clock signal at a multiple (e.g. four times) of the color subcarrier frequency $f_{sc}$ and phase locked thereto. Phase lock of the $4f_{sc}$ signal is maintained throughout horizontal scan line HL; however, phase correction is made only during each occurrence of burst reference signal 204. ADC 20 is, for example, an eight-bit "flash" converter such as the CA3308 available from RCA Corporation, Solid-State Division, Somerville, N.J. The digital video samples CV' are digitally processed and converted to kinescope drive signals by video processor 22. The drive signals are coupled to kinescope 24 which displays the picture information.

If the 256 levels of the eight-bit digital samples CV' produced by ADC 20 are made to correspond to the entire expected 160 IRE unit amplitude range of composite video signal CV, then the quantizing resolution is 0.625 IRE unit. Thus, the 40 IRE unit amplitudes of the synchronizing pulse 202 and color reference burst signal 204 would use about 40/160 or 25% of full range. This means that six of the eight bits of the digital samples will be utilized for representing the synchronization and color reference burst information.

In the embodiment of FIG. 1, sync detector 26, timing circuits 28, gain timing controller 30 and gain and offset changer 32 cooperate to increase the scaling and change the offset exhibited by ADC 20 during horizontal blanking interval HB so that the full range of ADC 20 is utilized in producing digital samples CV' representing the various portions of the video signal. To this end, time intervals $T_1$, $T_2$ and $T_3$ are defined to correspond to the portions of video signal 200 including synchronizing pulse 202, color reference burst signal 204 and picture information 208, 210, 212 respectively, as shown in FIG. 2a. The scaling factor and offset of ADC 20 are changed during times $T_1$ and $T_2$ as described below.

Sync detector 26 responds to the digital samples representing the negative-going level of synchronizing pulse 202 to develop horizontal synchronizing signal HS and to the digital samples representing the vertical synchronizing pulses (not shown) to develop vertical synchronizing signal VS. In addition, a digital comparison of the value of the digital samples CV' during horizontal synchronizing pulse 202 (i.e., the "sync tip" level) to a reference synchronizing level produces a digital reference signal AGC. This difference signal represents video signal amplitude error which can be employed to provide automatic gain control, as is described below. The foregoing assumes that composite video signal CV is standardized as to its amplitude range and baseline (blanking) level. It is understood that sync detector 26 can additionally include apparatus to compare the blanking level 206 to a desired level thereof and to provide a signal to control the blanking level (i.e., perform d.c. restoration).

Figure 3:
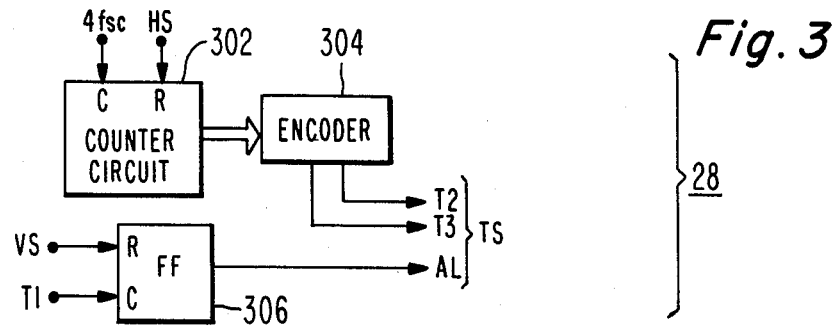
FIGS. 3, 4 and 5 are schematic diagrams of portions of the embodiment shown in FIG. 1.
Figure 4:
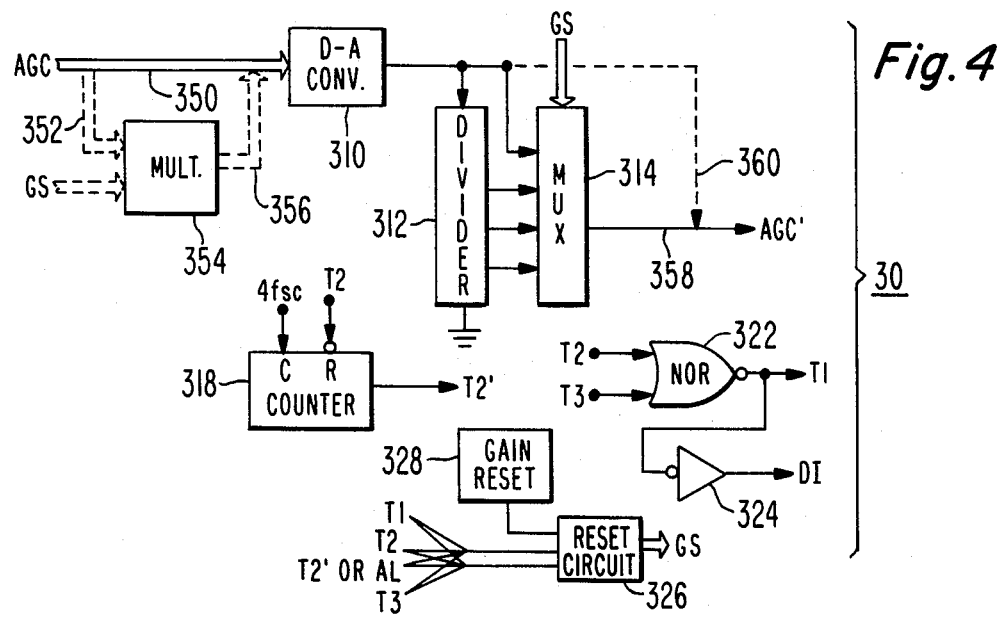
Figure 5:
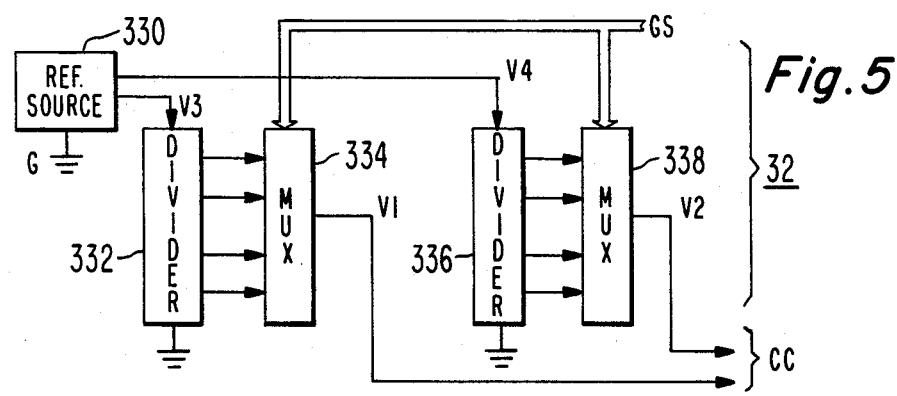

Before describing the detailed embodiments of FIGS. 3–5, it will be helpful to understand their purpose. Arrangements 28, 30 and 32 cooperate to control the scaling and offset characteristics of ADC 20 so that the full range of digital sample values produced during each sequential portion of horizontal line HL will closely correspond to the different analog signal ranges of composite video signal CV for each portion. This is illustrated by TABLE I which compares a conventional fixed-range ADC with the characteristics of an embodiment of the present invention in which different scaling and different offset is employed for each of intervals $T_1$, $T_2$ and $T_3$.

TABLE I

| Time Interval | Composite Video Signal CV (IRE Units) | Digital Samples CV' | Quantizing Resolution (IRE Units) |
|---|---|---|---|
| Conventional: | −40 (sync tip) | 0 | 0.625 |
|  | 120 | 255 |  |
| Present Invention: |  |  |  |
| $T_1$ | 0 (blanking) | 255 |  |
|  | −40 (sync tip) | 51 | 0.195 |
|  | −50 | 0 |  |
| $T_2$ | +25 | 255 |  |
|  | +20 (nominal burst positive peak) | 230 |  |
|  | 0 (blanking) | 128 | 0.195 |
|  | −20 (nominal burst negative peak) | 26 |  |
|  | −25 | 0 |  |
| $T_3$ | 120 | 255 | 0.598 |

TABLE I-continued

| Time Interval | Composite Video Signal CV (IRE Units) | Digital Samples CV' | Quantizing Resolution (IRE Units) |
|---|---|---|---|
|  | −33 | 0 |  |

Timing circuits 28, shown in FIG. 3, develop timing signals TS from synchronizing signals HS and VS, and from clocking signal $4f_{sc}$. Digital counter circuit 302 counts clocking signal $4f_{sc}$ and is reset at the start of each horizontal line by horizontal signal HS. The count developed by counter 302 indicates time elapsed since the last received horizontal signal HS. That count is applied to count encoder 304 which includes conventional gating circuits for developing therefrom the timing signals T2 and T3 shown in FIGS. 2c and 2d, respectively, having positive-going pulse widths which correspond to time intervals $T_2$ and $T_3$. Flip flop 306 is reset at the beginning of each TV field by vertical signal VS and thereafter toggles in response to timing signal T1 developed by controller 30. Flip flop 306 develops alternating line signal AL shown in FIG. 2f and which is, for example, a logically high level on even numbered horizontal lines HL and a low level on odd numbered lines HL (shown only in part). Timing signals T2, T3 and AL are timing signals TS.

Gain timing controller 30 shown in FIG. 4 responds to timing signals TS to develop gain and offset control signals GS. NOR gate 322 responds to timing signals T2 and T3 to produce timing signal T1 shown in FIG. 2b having a positive-going pulse width corresponding to time interval $T_1$. Signals T1, T2, T3 and AL supply the bits of a digital control word which is transmitted by reset circuit 326 as gain and offset control signals GS. (The operation of reset circuit 326 and the functions of signals T2' and AL are explained below.) Controller 30 also includes digital-to-analog converter (DAC) 310 which converts the digital gain error signal AGC into an analog gain control signal AGC' to be applied via connection 360 (shown in phantom) to tuning system 12 and IF amplifier 14 which provide gain control in conventional fashion.

Gain and offset changer 32 develops analog reference level signals V1 and V2 which together comprise the converter control signal CC supplied to ADC 20. The reference levels V1 and V2 are applied to opposing ends of the resistive reference voltage divider in flash converter ADC 20. When V1 and V2 are changed so that their difference voltage is modified, the scaling factor (or gain) exhibited by ADC 20 will be modified. In other words, the range of analog levels of composite video signal CV which produces or corresponds to the full range of values of digital samples CV' is modified. Increasing that difference increases the range of analog levels corresponding to the full range of digital output values, thereby decreasing the quantization resolution; decreasing that difference decreases the range of analog levels corresponding to the full range of digital output values, thereby increasing the quantization resolution.

When V1 and V2 are changed so that their average value (V1+V2)/2 is modified, the scaling of ADC 20 is unchanged but its offset is changed. For example, if the average of V1 and V2 is zero, then a zero analog level of CV produces the digital value of CV' corresponding to the mid-point value (e.g., either 127 or 128 in an eight-bit system having values from 0 to 255). If the average of V1 and V2 is modified to be 0.5 volt, then a 0.5 volt level of CV produces the digital value 127 (or 128) of CV'. It is understood that the decimal number is used herein to refer to the digital value of samples CV', i.e., the decimal equivalent of the binary value of CV'. For example, "01111111" is referred to as "127", "1000000" as "128" and so forth.

An embodiment of gain and offset changer 32 shown in FIG. 5 includes reference source 330 which provides two reference voltages V3 and V4. V3 and V4 are respectively applied to multiple output voltage dividers 332 and 336 to produce a plurality of portions of each of reference voltages V3 and V4, which are applied to multiplexers 334 and 338, respectively. Gain signal GS is applied to address each of multiplexers 334 and 336 to select respective ones of the plurality of portions of voltages V3 and V4 as control signal levels CC for ADC 20.

Selection of the reference voltages V3 and V4 and taps of voltage dividers 332 and 336 is desirably made to produce the levels of digital values of CV' as listed in TABLE I above. It is noted that the scaling (i.e., gain) is increased during time intervals $T_1$ and $T_2$ so that a 50 IRE unit range corresponds to 256 digital levels and that the offset is changed so that the blanking level corresponds to level 255 in interval $T_1$ and to level 127 in interval $T_2$.

Gain-timing controller 30 of FIG. 4 further includes apparatus providing for yet another change to the scaling and offset exhibited by ADC with respect to color reference burst signal 204 during interval $T_2$. The apparatus thus far described has satisfactory quantizing resolution for determining the amplitude of reference burst 204 for automatic color control purposes. It is advantageous to provide even greater resolution so that the zero crossings (crossings of the blanking level) are more accurately determined for purposes of digital control of the phase of the sampling signal $4f_{sc}$. To that end, substantially increased scaling is provided during intervals $T_2$ occurring on alternate horizontal lines HL in response to alternate line signal AL shown in FIG. 2f. Signal AL is included as an additional bit of gain signal GS in FIG. 4 and is applied to address the multiplexers 334 and 336 of FIG. 5. The correspondence between composite video signals CV and digital samples CV' in this arrangement is given in TABLE II below.

TABLE II

| Time Interval | Composite Video Signal CV (IRE Units) | Digital Samples CV' | Quantizing Resolution (IRE Units) |
|---|---|---|---|
| $T_2$ (even lines) | +25 | 255 | |
| | 0 (blanking) | 127 | 0.195 |
| | −25 | 0 | |
| $T_2$ (odd lines) | +10 | 255 | |
| | 0 (blanking) | 127 | 0.078 |
| | −10 | 0 | |

Alternatively, substantially increased scaling of chroma signal 204 can be provided during each occurrence of interval $T_2$ rather than for alternate occurrences thereof as just described. This is accomplished during a sub-interval portion of interval $T_2$. To this end, digital counter 318 of FIG. 4 is reset by timing signal $T_2$ and counts in response to a clocking signal, for example, signal $4f_{sc}$, to produce timing signal $T_2'$ shown in FIG. 2e. Timing signal $T_2'$ is a high level (228) during the initial portion of interval $T_2$ to produce the same scaling and offset of ADC 20 as are given in the first entry ($T_2$ (even lines)) in TABLE II above. Signal $T_2'$ is a low level during the remainder of interval $T_2$ to produce the same scaling and offset as are given in the second entry in TABLE 2. In this arrangement, both reference burst amplitude and phase are determined with greatest quantizing resolution for every horizontal line HL.

When ADC 20 is made to exhibit changed scaling and offset characteristics, the values of digital samples CV' during intervals $T_2$ and $T_3$ can be the same as that obtained for synchronizing pulse 202 during interval $T_1$. To avoid erroneous detection of digital samples of reference burst 204 and picture information 208, 210, 212 as synchronizing pulses, timing signal T1 is inverted by inverter 324 and is applied to sync detector 26 to inhibit the detection of signals CV' as synchronizing signals except during interval $T_1$.

In addition, gain-timing controller 30 includes an arrangement to ensure that proper acquisition of a TV signal is achieved before the time-multiplexed modification of gain by the apparatus herein described is initiated. Gain reset generator 328 of FIG. 4 applies a low level signal to reset circuit 326 for a predetermined period of time following the initial application of power (when a user turns on the TV receiver) or selection of a new TV channel. In addition, it is desirable that generator 328 periodically develops the low level signal to verify that proper operation continues. Reset circuit 326 is, for exampe, four AND gates each receiving one of the four signals T1, T2, T3 and AL, and each receiving the reset signal from generator 328. The low level from reset generator 328 causes reset circuit 326 to produce zero outputs for the four bits of gain signals GS. The zero value signals GS are addresses which control multiplexers 334 and 338 to select the voltage levels from dividers 332 and 336 which cause ADC 20 to exhibit conventional scaling and offset (e.g., first entry in TABLE I). When the TV signal is properly acquired or is verified, as indicated, for example, by the development of synchronizing signals VS and HS by sync detector 26, generator 328 produces a high level enabling reset circuit 326 to transmit signals T1, T2, T3 and AL as the bits of the digital word of gain signals GS.

It is further contemplated that gain timing controller 30 be employed to modify the gain control signal AGC' supplied to tuning system 12 and IF amplifier 14. To that end, as shown in FIG. 4, plural-tap voltage divider 312 and multiplexer 314 respond to gain signals GS to modify the portion of the analog gain control signal produced by DAC 310 which is supplied as control signal AGC' via connection 358. Divider 312 and multiplexer 314 are similar to dividers 332 and 336 and multiplexers 334 and 336 described above.

Modifications to the embodiments herein described are contemplated to be within the present invention which is limited only by the claims following. For example, even greater quantizing resolution can be obtained by employing yet other scaling and offsetting levels for ADC 20. One example thereof is given in Table III below.

TABLE III

| Time Interval | Composite Video Signal CV (IRE Units) | Digital Samples CV' | Quantizing Resolution (IRE Units) |
|---|---|---|---|
| $T_1$ | −30 | 255 | |
| | −40 (sync tip) | 127 | 0.078 |
| | −50 | 0 | |
| $T_2$ | +30 | 255 | |
| | +20 (nominal burst peak) | 170 | 0.117 |

TABLE III-continued

| Time Interval | Composite Video Signal CV (IRE Units) | Digital Samples CV' | Quantizing Resolution (IRE Units) |
| --- | --- | --- | --- |
| | 0 (blanking) | 0 | |

One particular advantage of such greatly increased quantizing resolution results with respect to operation of a "color killer" apparatus. A color killer inhibits the development of color signals to produce a black-and-white picture display when the color reference burst signal amplitude is too small to reliably produce accurate color images. The color killer threshold is, for example, about 18 dB below the nominal 20 IRE zero-to-peak level, i.e. at about 2.5 IRE units. With a conventional ADC, the digital value difference could be set to either a value of three which corresponds to 2.03 IRE units and is 19.8 dB below nominal burst or a difference value of four which corresponds to 2.70 IRE units and is 17.4 dB below burst. Thus, the quantizing resolution is insufficient to precisely resolve the desired color killer threshold. With the present invention, however, the analog-to-digital correspondence set forth in TABLE III for interval $T_2$ permits the color killer threshold to be set at a digital value of 21 which is within 0.17 dB of the desired $-18$ dB threshold.

It is understood that the selection of timing intervals, scaling and offsets described herein are exemplary. It is also satisfactory, for example, that different scaling be employed on alternate lines, every third line, every fourth line, and so forth.

By way of further example, it is also satisfactory that sync detector 26 be an analog detector responsive to the composite video signal CV rather than a digital detector responsive to the digital samples CV' as herein described.

Still further, modification of the signal magnitudes can be performed by a digital, rather than an analog, operation. For example, voltage divider 312, multiplexer 314 and connections 350 and 358 in FIG. 4 can be replaced by digital multiplier 354 and connections 352, 356 and 360 (shown in phantom). Thus, digital gain control signal AGC is modified in accordance with the gain signals GS by multiplier 354, which can be a read-only memory, before being converted into an analog control signal AGC' by DAC 310.

It is noted that clock generator 18 can generate clocking signal $4f_{sc}$ using a digital phase-locked loop arrangement responsive to the reference burst portion of digital samples CV' rather than to analog video signal CV.

What is claimed is:

1. In a television receiver including a source of analog video signals having a predetermined range of analog levels and having repetitive line signals with at least first and second sequential signal portions therein, and processing means for processing digital video samples, apparatus comprising:
    analog-to-digital converting means coupled to said source for developing digital video samples, having a full range of digital values, for representing said analog signals, wherein said converting means includes means responsive to a control signal for changing the correspondence between said digital video samples and said analog signals to substantially change the range of analog levels which may be represented by said full range of digital values;
    timing means responsive to one of said analog video signals and said digital video samples for providing signals indicating times when said first and second sequential signal portions occur; and
    gain controlling means responsive to said indicating signals for developing said control signal to obtain said correspondence for said first sequential signal portion that is different than said corresondence for said second sequential signal portion.

2. In a television receiver including a source of analog video signals having a baseline level and a predetermined range of analog levels relative to said baseline level and having repetitive line signals with first and second sequential signal portions therein, and processing means for processing digital video samples, apparatus comprising:
    analog to digital converting means coupled to said source for developing digital video samples, having a full range of digital values, for representing said analog signals, wherein said converting means includes means responsive to a control signal for changing the correspondence between said digital video samples and said analog signals to substantially change the range of analog levels which may be represented by said full range of digital values;
    timing means responsive to one of said analog video signals and said digital video samples for providing signals indicating times when said first and second sequential signal portions occur; and
    gain controlling means responsive to said indicating signals for developing a scaling signal to be applied as part of said control signal to said converting means to cause said full range of digital values to correspond to substantially less than said predetermined range of analog levels.

3. The apparatus of claim 2 wherein said scaling means includes:
    means for developing a plurality of reference signal levels representing different scaling ranges of said converting means; and
    means responsive to said indicating signals for selecting one of said plurality of reference signal levels as said scaling part of said control signal.

4. The apparatus of claim 2 wherein said gain controlling means includes offsetting means for developing an offsetting signal to cause said converting means to change the value of said digital video samples corresponding to said baseline level of said analog video signals, and for supplying said offsetting signal as part of said control signal.

5. The apparatus of claim 4 wherein said offsetting means includes:
    means for developing a plurality of offsetting signal levels representing different baseline levels of said converting means; and
    means responsive to said indicating signals for selecting one of said plurality of offsetting signal levels as said offsetting part of said control signal.

6. The apparatus of claim 2 wherein said first and second sequential signal portions substantially correspond to the horizontal blanking interval and the picture information portions, respectively, of a composite video signal, the signals in said portions being superimposed on a baseline level of said composite video signal.

7. The apparatus of claim 6 wherein said composite video signal includes synchronizing signal and color burst portions within said horizontal blanking interval portion;

said timing means generates further indicating signals representing the occurrences of said synchronizing signal and said color burst portions:

said gain controlling means includes scaling means responsive to said further indicating signals for developing a scaling signal as part of said control signals to change a scaling factor of said converting means to develop the full range of said digital video samples produced by said converting means during the occurrences of said synchronizing signal and said color burst portions; and said gain controlling means includes offsetting means responsive to said further indicating signals for developing an offsetting signal as part of said control signal to change the value of said digital video sample produced by said converting means corresponding to said baseline level of said analog video signals during the occurrences of said synchronizing signal and said color burst portions.

8. The apparatus of claim 7 wherein said timing means further develops a signal indicating alternate ones of scan lines of said composite video signal, and said gain controlling means includes means responsive thereto for changing the scaling signals produced by said scaling means during occurrences of said color burst portions of said alternate ones of said scan lines.

9. The apparatus of claim 7 wherein said timing means further develops a signal indicating a subportion of said color burst portions, and said gain controlling means includes means responsive thereto for changing the scaling signals produced by said scaling means during occurrences of said subportions of said color burst portions.

10. The apparatus of claim 2 wherein said source includes means responsive to an analog gain control signal for scaling the amplitude of said analog video signals, said timing means includes means responsive to the magnitude of a predetermined portion of said one of said analog video signals and said digital video samples for developing said analog gain control signal therefrom, and means for applying said analog gain control signal to said source.

11. The apparatus of claim 10 wherein said means for applying is included within said gain controlling means for modifying said analog gain control signal during said first and second sequential portions in response to said control signal.

12. The apparatus of claim 11 wherein said means for applying includes means for developing a plurality of fractional portions of said analog gain control signal, and means responsive to said control signal for selecting one of said fractional portions as said analog gain control signal applied to said source.

13. In a digital television receiver including a video detector for supplying composite video signals having sequential synchronizing pulse, color reference burst and picture information portions superimposed on a blanking level, and further including a digital signal processor for processing digital video samples representing said composite video signals, apparatus comprising:

an analog-to-digital converter for developing said digital video samples in response to said composite video signal, said analog-to-digital converter exhibiting a scaling factor relating a predetermined range of levels of said composite video signals to a predetermined range of values of said digital video samples, and exhibiting an offset relating said blanking level to a predetermined value of said digital video samples, wherein said scaling factor and said offset are controllable in response to first and second control signals, respectively;

a detector responsive to one of said composite video signals and said digital video samples for developing synchronizing signals responsive to a synchronizing pulse portion of said composite video signals;

timing apparatus responsive to said synchronizing signals for developing first, second and third timing signals having durations substantially corresponding to the durations of said synchronizing pulse, said color reference burst and said picture information portions, respectively; and gain controlling apparatus responsive to said first, second and third timing signals for developing said first and second control signals so that said scaling factor and said offset have different values during said synchronizing pulse, said color reference burst and said picture information portions.

14. The apparatus of claim 13 wherein said gain controlling apparatus comprises a source of a plurality of analog reference level signals and at least one multiplexer to which said analog reference level signals are applied for selecting ones thereof as said first and second control signals in response to said first, second and third timing signals.

15. The apparatus of claim 13 wherein at selected times said gain controlling apparatus in response to said second timing signal develops said first control signal to substantially increase said scaling factor so that the digital video samples developed by said analog-to-digital converter in response to said color reference burst portion of said composite video signal exhibit a full range of values corresponding to a predetermined range of amplitudes of said color reference burst portion close to the amplitude of said blanking level.

16. The apparatus of claim 15 wherein said gain controlling apparatus includes a timing circuit responsive to said second timing signal for making said selected times correspond to a predetermined portion of the duration of said second timing signal.

17. The apparatus of claim 15 wherein said timing apparatus includes a bistable device responsive to said synchronizing signal for producing a fourth timing signal at a submultiple of the repetition rate thereof, and said gain controlling apparatus includes a gating circuit responsive to said second and fourth timing signals for making said selected times correspond to occurrences of the duration of said second timing signal at said submultiple repetition rate.

18. The apparatus of claim 15 wherein said gain controlling apparatus develops an inhibiting signal at said selected times and includes means for applying said inhibiting signal to said detector to inhibit the development of said synchronizing signals at said selected times.

* * * * *